Dec. 11, 1973  O. PROFOS  3,778,346
NUCLEAR POWER STATION
Filed Sept. 16, 1968  2 Sheets-Sheet 2

Inventor:
OSKAR PROFOS
BY
Kenyon & Kenyon
ATTORNEYS

United States Patent Office 3,778,346
Patented Dec. 11, 1973

3,778,346
NUCLEAR POWER STATION
Oskar Profos, Winterthur, Switzerland, assignor to Sulzer Brothers, Ltd., Winterthur, Switzerland
Filed Sept. 16, 1968, Ser. No. 762,185
Claims priority, application Switzerland, Sept. 29, 1967, 13,103/67
Int. Cl. G21c 13/10
U.S. Cl. 176—60                                                    7 Claims

ABSTRACT OF THE DISCLOSURE

The nuclear power station is constructed to house the reactor pressure vessel above the machine room ceiling with the ceiling being of a thin thickness. Should a leak of working medium occur in the machine room, the pressure on the ceiling of the machine room is counterbalanced by the weight of the reactor.

---

This invention relates to a nuclear power station, and particularly, to a nuclear power station housing a reactor power vessel and a machine room.

Nuclear power stations have been constructed with a reactor pressure vessel and a pressure tight machine room for circulation of a working medium. Generally, after leaving a reactor housed in the presure vessel, the working medium is expanded in a turbine, is then cooled in a cooler, compressed in a compressor and returned to the reactor; the turbine, cooler and compressor being housed in the machine room. The machine room has been further constructed of dimensions to permit the working medium to expand within the machine room in the event of a leak until the pressures in the machine room and pressure vessel are equal without leakage to the exterior environment at the prevailing pressure.

In some instances, the machine room of these nuclear power stations has been built in the form of a large pressure-tight steel vessel which has also housed the reactor pressure vessel. However, this construction has been relatively expensive without making the station correspondingly safer from an escape of working medium to the exterior.

Accordingly, it is an object of the invention to provide a safe, economical and compact nuclear power station.

It is another object of the invention to utilize the weight of a nuclear reactor to balance any pressure caused by working medium leakage in an associated machine room.

Briefly, the invention provides a nuclear reactor station with a machine room which supports a reactor pressure vessel on the ceiling. The floor of the reactor pressure vessel as well as the ceiling of the machine room can thus be made relatively thin. Alternatively, the floor and ceiling can be made integral with each other.

Figure 1:
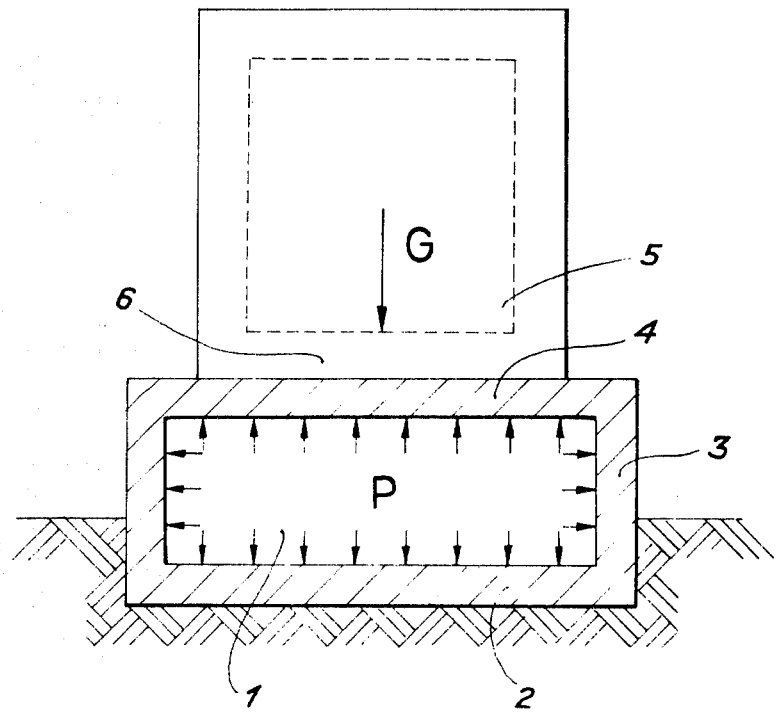
Figure 2:
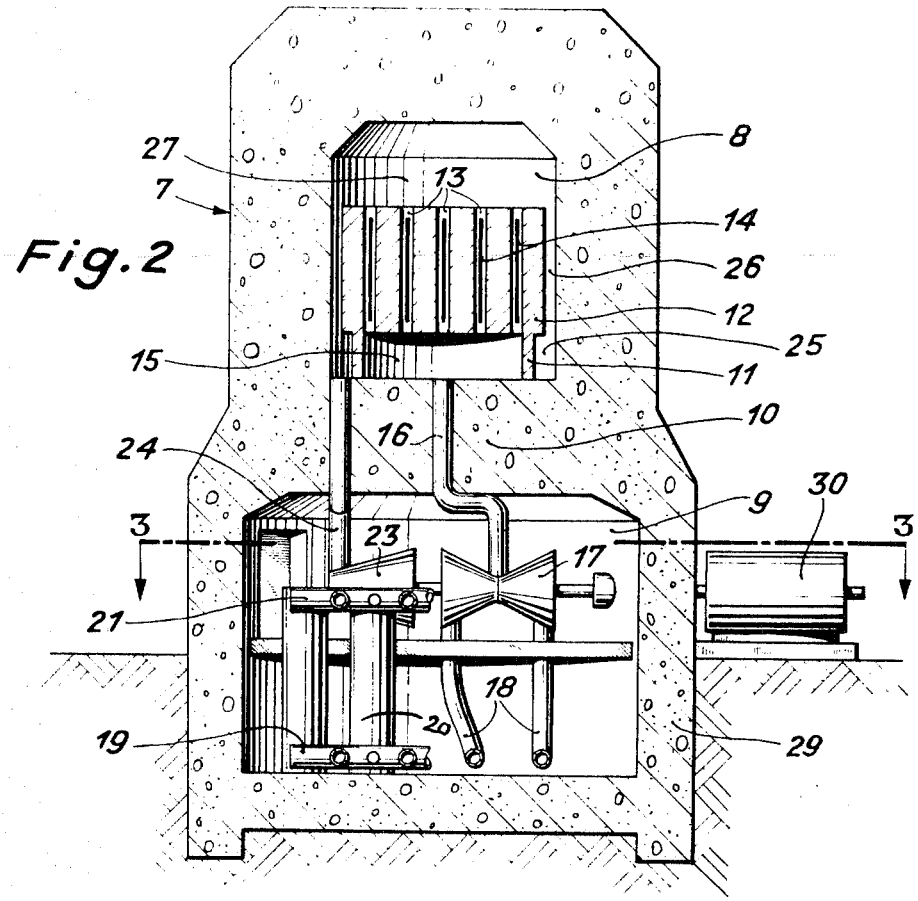
Figure 3:
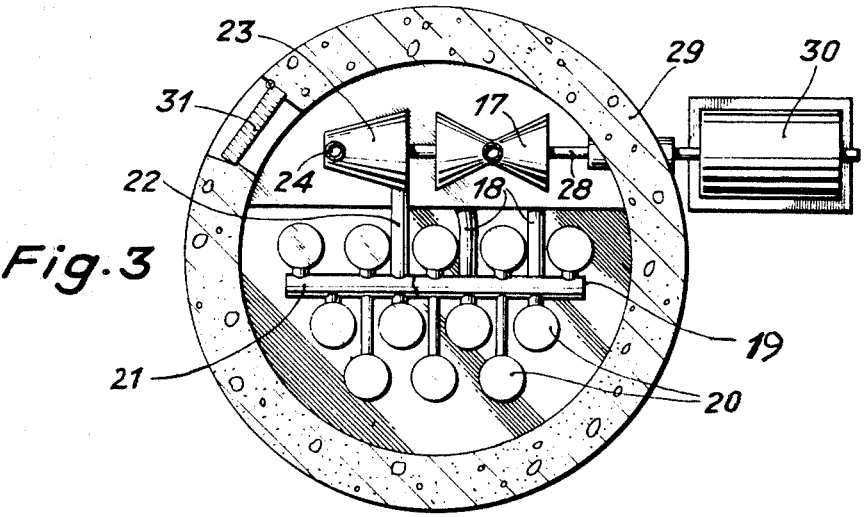

These and other objects and advantages of the invention will become more apparent from the following detailed description and appended claims taken in conjunction with the accompanying drawings in which:

FIG. 1 diagrammatically illustrates one embodiment of a nuclear power station according to the invention;

FIG. 2 illustrates a cross sectional view of another embodiment of a nuclear power station according to the invention; and FIG. 3 illustrates a view taken on line 3—3 of FIG. 2.

Referring to FIG. 1, a nuclear power station has a machine room 1 constructed with a floor 2 below grade, a wall 3 and a ceiling 4. In addition, a reactor pressure vessel 5 which is of a high weight G is carried on the ceiling 4 of the machine room 1 via the floor 6 of the pressure vessel. During normal operation, the wall 3 of the machine room 1 is subjected to vertical pressure by the weight of the pressure vessel 5 bearing thereon. In order to support such pressure, the wall 3 can be constructed of upright annular elements with circular reinforcement.

In the event of a fault, i.e. when the working gas enters the machine room as a result of a leak, an excess pressure P arises in the machine room and acts on the ceiling 4. Because of the counter pressure due to the weight of the pressure vessel 5, only very slight bending stresses can arise in the ceiling. Since the pressure acting on the floor 2 is absorbed by the ground, this floor need not be particularly thick. Further, although partly relieved of the vertical pressure, the wall 3 is subjected to radial internal pressure which causes a variation in loading. With the annular wall construction described above, this internal pressure can easily be absorbed by the circular reinforcements, which are then subjected to tensile stress. Alternatively, the machine room can be kept low enough below grade for the ceiling and floor to be subjected almost entirely to radial tension and the wall to slight bending stress.

Alternatively, the ceiling 4 of the machine can be constructed in such a way it also forms the floor of the reactor pressure vessel. Conversely, the floor 6 of the reactor pressure vessel can also form the ceiling of the machine room. The pressure vessel floor is, in any case, highly reinforced and bend-resistant.

Referring to FIG. 2, the nuclear power station is housed in a single concrete structure 7. The concrete structure 7 contains two closed pressure-tight chambers 8, 9 which are separated by a partition 10. The upper chamber 7 acts as a reactor pressure chamber while the lower chamber 9 acts as a machine room. The partition 10 functions both as the ceiling of the machine room and as the floor of the reactor pressure chamber. The partition 10 also acts as a shield against radiation into the lower chamber 9. The reactor pressure chamber 9 contains a baffle ring 11 which carries a reactor core 12 with fuel channels 13 containing fuel rods 14.

Referring to FIGS. 2 and 3, in operation, a heated working gas issuing from the fuel channels 13 flows out of a central chamber 15 below the reactor core 12 through a passage 16, which passes through the partition 10, into a double-flow gas turbine 17. The expanded gas then flows through two passages 18 into a distributor 19. From this distributor 19, the gas passes along branch lines into a plurality of coolers 20 arranged in parallel for cooling by means of water. On leaving the coolers, the gas flows to a header 21 and thence along a duct 22 to a compressor 23. From the compressor 23, the gas flows along a passage 24 to an annular chamber 25 beneath the reactor core 12 and outside the baffle ring 11 and then up through an annular gap 26 between the core 12 and the internal wall of the pressure vessel to a distribution chamber 27 above the core 12 and back into the fuel channels 13.

The gas turbine 17 and compressor 23 have a common shaft 28, which passes in a gas-tight manner through the machine room wall 29 and is connected outside the machine room to a turbo generator 30.

The dimensions of the machine room are such that the product of the internal ceiling area of the lower chamber 9 and the pressure arising in the lower chamber 9 in the event of a fault is of the order of magnitude of the weight of the concrete reactor pressure vessel above the lower chamber 9. In this way, the bending stresses arising in the ceiling and floor of the lower chamber 9 remain relatively low. The wall 29 of the machine room is constructed of reinforced concrete and is of such dimensions as to carry the reactor pressure vessel above it and can absorb the pressure arising in the machine room in the event of a fault. The dimensions of the partition 10 are such as to withstand the highest pressure arising in the reactor pressure chamber 8 at the temperature which arises at the same time. Also, the partition is designed to protect the machine room sufficiently from radiation from the reactor, so that the machine room is accessible. The machine room can also have a door 31 or a lock in the wall 29 to permit entry into the lower chamber 9.

Although the invention has been described with reference to a nuclear power station having a gaseous working medium, it may also be applied, of course, to a nuclear power station having some other working medium.

What is claimed is:

1. A reactor power plant comprising
a pressure vessel for housing a nuclear reactor core;
a pressure tight machine room mounted in pressure tight relation to said pressure vessel and housing a turbine, compressor and cooler therein to convert thermal energy in a working medium passing from said pressure vessel into said turbine, compressor and cooler into mechanical energy and having a ceiling supporting said reactor pressure vessel, said machine room being sized to withstand the maximum pressure which may arise therein due to a leak of working medium, said ceiling being dimensioned wherein the product of the internal area of said ceiling and said maximum pressure in said machine room is of the order of magntiude of the weight of said reactor pressure vessel and the contents thereof; and
a closed flow path between said pressure vessel and said turbine, compressor and cooler in said machine room for conveying the working medium in sealed relation between said pressure vessel and said machine room.

2. A nuclear power station as set forth in claim 1 wherein said reactor pressure vessel has a floor, said floor resting on said ceiling of said machine room.

3. A nuclear power station as set forth in claim 1 wherein said ceiling of said machine room is simultaneously the floor of said reactor pressure vessel.

4. A nuclear power station as set forth in claim 1 wherein said machine room and said reactor pressure vessel are housed in a single concrete structure, said structure having a partition forming said ceiling to separate said machine room and reactor pressure vessel.

5. A nuclear power station as set forth in claim 4 wherein said partition is constructed as a radiation shield.

6. A nuclear power station comprising
a reactor pressure vessel housing a reactor core, said vessel including thick radiation absorbing and pressure supporting side walls, a ceiling and a floor;
a machine room housing thermal machine including a turbine, cooler and compressor for converting heat derived from a reactor cooling medium passing from said reactor core into mechanical energy, said machine room having a ceiling of a substantially larger area than said floor of said reactor pressure vessel with said reactor pressure vessel constituting at least a part of said ceiling of said machine room; and
a plurality of passages in said ceiling for conveying the reactor cooling medium between said vessel and said thermal machines in said machine room in sealed relation within a closed circuit path.

7. A nuclear power station comprising
a single structure containing two closed pressure-tight vertically disposed chambers and a partition separating said chambers, said partition forming a ceiling for the lower one of said chambers and a floor for the upper one of said chambers;
a reactor core mounted in said upper chamber;
a turbine, at least one cooler and a compressor mounted in said lower chamber;
a first passage in said partition for directing a flow of working gas from said upper chamber to said turbine, cooler and compressor in said lower chamber in sealed relation; and
a second passage in said partition for directing the flow of working gas from said lower chamber to said upper chamber in sealed relation wherein the product of the internal area of said ceiling of said lower chamber and the pressure arising in said lower chamber in the event of a leak of working gas into said lower chamber is of the order of magnitude of the weight of said upper chamber and said reactor core.

References Cited

UNITED STATES PATENTS

| | | | |
|---|---|---|---|
| 3,402,102 | 9/1968 | Kagi | 176—60 X |
| 3,297,542 | 1/1967 | Costes | 176—60 X |
| 3,359,175 | 12/1967 | Arthur et al. | 176—65 X |
| 3,070,533 | 12/1962 | Arms et al. | 176—40 |
| 3,089,840 | 5/1963 | Carter et al. | 176—94 X |

FOREIGN PATENTS

| | | | |
|---|---|---|---|
| 799,212 | 8/1958 | Great Britain | 204—193.32 |

REUBEN EPSTEIN, Primary Examiner

U.S. Cl. X.R.

176—38, 87

UNITED STATES PATENT OFFICE
CERTIFICATE OF CORRECTION

Patent No. 3,778,346         Dated   December 11, 1973

Inventor(s)   Oskar Profos

It is certified that error appears in the above-identified patent and that said Letters Patent are hereby corrected as shown below:

The date of priority is incorrect. The correct date is September 19, 1967.

Column 1, line 26, "presure" should be --pressure--.

Column 2, line 21, after "way" insert --that--.

Column 2, line 29, "7" should be --8--.

Column 2, line 35, "9" should be --8--.

Signed and sealed this 9th day of April 1974.

(SEAL)
Attest:

EDWARD M. FLETCHER, JR.
Attesting Officer

C. MARSHALL DANN
Commissioner of Patents